United States Patent [19]

Kirchner

[11] Patent Number: 5,789,513
[45] Date of Patent: Aug. 4, 1998

[54] POLYFLUOROURETHANE ADDITIVES FOR CURABLE COATING COMPOSITIONS

[75] Inventor: Jack Robert Kirchner, Wilmington, Del.

[73] Assignee: E. I. du Pont de Nemours and Company, Wilmington, Del.

[21] Appl. No.: 807,855

[22] Filed: Feb. 26, 1997

[51] Int. Cl.$^6$ .................. C08L 67/06; C08L 67/08; C08L 75/14
[52] U.S. Cl. .................. 525/7; 525/440; 525/445; 525/455; 525/457; 528/70; 528/74.5; 528/288; 528/295.5
[58] Field of Search .................. 525/7, 455, 445, 525/440, 457; 528/70, 74.5, 288, 295.5

[56] References Cited

U.S. PATENT DOCUMENTS

| | | | |
|---|---|---|---|
| 3,378,609 | 4/1968 | Fasick et al. | 260/890 |
| 3,462,296 | 8/1969 | Raynolds et al. | 117/161 |
| 3,491,169 | 1/1970 | Raynolds et al. | 260/900 |
| 3,923,715 | 12/1975 | Dettre et al. | 260/29.6 R |
| 4,054,592 | 10/1977 | Dear et al. | 560/25 |
| 4,097,642 | 6/1978 | Dear et al. | 428/262 |
| 4,401,780 | 8/1983 | Steel | 524/225 |
| 4,539,006 | 9/1985 | Langford | 8/94.1 R |
| 4,595,518 | 6/1986 | Raynolds et al. | 252/8.6 |
| 4,735,848 | 4/1988 | Kondo et al. | 428/219 |
| 4,758,471 | 7/1988 | Arioka et al. | 428/336 |
| 4,946,992 | 8/1990 | Falk et al. | 560/227 |
| 4,958,039 | 9/1990 | Pechhold | 556/421 |
| 5,087,672 | 2/1992 | Babirad et al. | 525/329 |
| 5,188,747 | 2/1993 | Kai et al. | 252/54 |
| 5,350,878 | 9/1994 | Caporiccio | 560/227 |

FOREIGN PATENT DOCUMENTS

| | | |
|---|---|---|
| 0 068 040 A1 | 1/1983 | European Pat. Off. |
| 614874-A2 | 9/1994 | European Pat. Off. |
| 0 694 532 A1 | 1/1996 | European Pat. Off. |
| 28 21 495 C2 | 6/1984 | Germany. |
| 50-047t912-A | 4/1975 | Japan. |
| 3-167158 | 7/1991 | Japan. |
| 05232718 A | 9/1993 | Japan. |
| 05246951 | 9/1993 | Japan. |
| 07026204 A | 1/1995 | Japan. |
| WO 91/18859 | 12/1991 | WIPO. |

*Primary Examiner*—Patricia A. Short

[57] ABSTRACT

A coating composition comprising an alkyd or urethane resin and a polyfluorourethane of Formula II $$(R_f\text{—}X\text{—}O\text{—}CO\text{—}NH)_m\text{—}A\text{—}(NH\text{—}CO\text{—}O\text{—}R)_{(p-m)} \quad \text{II}$$

wherein $R_f$ is a $C_2$–$C_{20}$ linear or branched fluorocarbon,

X is —(CH$_2$)$_n$—, —(CH$_2$)$_g$SO$_z$(CH$_2$)$_t$—, or —SO$_2$N(R$_1$)CH$_2$CH$_2$— wherein n is 1 to about 20; g and t are each independently 1 to about 3; z is 0, 1 or 2; and R$_1$ is an alkyl of 1 to about 4 carbon atoms;

A is an aliphatic, cycloaliphatic, aromatic, or heterocyclic radical;

R is a $C_3$–$C_{20}$ linear, branched, or cyclic aliphatic group containing at least one ethylenically unsaturated double bond and optionally at least one phenyl or phenyl substituted with $C_1$–$C_6$ alkyl or halogen;

p is 2 to 3; and m is from about 0.8 to about 1.25 when p is 2, and m is from about 1 to about (p-1) when p is greater than 2 is disclosed.

10 Claims, No Drawings

POLYFLUOROURETHANE ADDITIVES FOR CURABLE COATING COMPOSITIONS

FIELD OF THE INVENTION

This invention relates to coating compositions containing polyfluorourethanes and the cured coatings resulting from such compositions. The polyfluorourethanes are prepared from sequential reactions of diisocyanates or triisocyanates, fluoroalcohols, and unsaturated alcohols. Such polyfluorourethane additives provide durable oil- and water-repellent surfaces to the cured coating.

BACKGROUND OF THE INVENTION

The coating compositions of interest in the present invention are alkyd coating compositions and Type I urethane coating compositions, typically a paint, clear coating, or stain. The coating compositions are described in Outlines of Paint Technology, Halstead Press, New York N.Y., Third edition, 1990) and Surface Coatings Vol. I, Raw Materials and Their Usage (Chapman and Hall, New York N.Y., Second Edition, 1984). A common factor in these coating compositions is an unsaturated resin or prepolymer structure that permits the polymerization of olefinic groups in the backbone or sidechain.

Conventional alkyd coatings utilize, as the binder or film-forming component, a curing or drying alkyd resin. Alkyd resin coating compositions contain unsaturated aliphatic acid residues derived from drying oils. Such drying oils have been used as raw materials for oil-based coatings and are described in the literature. The alkyd resins spontaneously polymerize in the presence of oxygen or air to yield a solid protective film. The polymerization is termed "drying" or "curing" and occurs as a result of autoxidation of the unsaturated carbon-carbon bonds in the aliphatic acid component of the oil by atmospheric oxygen. When applied to a surface as a thin liquid layer of formulated alkyd coating, the cured films that form are relatively hard, non-melting, and substantially insoluble in many organic solvents that act as solvents or thinners for the unoxidized alkyd resin or drying oil.

Urethane coatings are classified by ASTM D-1) into five categories. Type I urethane coatings contain a pre-reacted autoxidizable binder as described in Surface Coatings Vol. I, previously cited. Type I urethane binders, also termed urethane oils, oil-modified polyurethanes, or urethane alkyds, are the largest volume category of polyurethane coatings. By the term "urethane coating," as used hereinafter, is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. The cured coating is formed by air oxidation and polymerization of the unsaturated drying oil residue in the binder.

Both the above-listed coating compositions after drying or curing show low hexadecane contact angles, are readily wetted by oil, and are susceptible to soiling. These prior art coating compositions have limited cleanability. It is desirable to improve these types of coating compositions to provide durable oil repellency and better cleanability and soil resistance.

Kirchner, in U.S. Pat. No. 5,414,111, discloses polyfluoro nitrogen-containing compounds formed, for instance, by reacting an isocyanurate trimer with fluorinated alcohols and then further extending the reaction product with water. Such products were applied to fibrous substrates such as carpets to impart water-, oil-, and soil repellency and/or soil release properties to such substrates. Kirchner does not disclose the use of such compounds as additives to curable coating compositions to improve oil repellency, nor would such compounds chemically bond during the curing process to provide durable oil repellency.

Certain perfluoroalkyl urethanes that do not react with alkyl enamel binders have been listed by Deibig et al. in German Patent DE 28 21 495 C2 and include the reaction product of an isocyanate or diisocyanate with one or two moles of a highly fluorinated alkanol or a carbinol containing at least three perfluorinated carbon atoms. Such additives do not provide oil repellency which is durable to scrubbing, presumably because the fluorinated additive, while migrating to the coating surface, is not chemically bonded into the binder to provide durability.

It is highly desirable to have wash resistant oil repellency in alkyd coatings and Type I urethane coatings. The present invention provides such compositions.

SUMMARY OF THE INVENTION

The present invention comprises a coating composition comprising an alkyd or urethane resin and a polyfluorourethane of Formula II

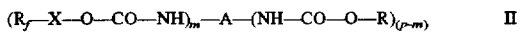

$$(R_f\text{—}X\text{—}O\text{—}CO\text{—}NH)_m\text{—}A\text{—}(NH\text{—}CO\text{—}O\text{—}R)_{(p-m)} \quad \text{II}$$

wherein
$R_f$ is a $C_2$–$C_{20}$ linear or branched fluorocarbon,
X is —$(CH_2)_n$—, —$(CH_2)_g SO_z(CH_2)_t$—, or —$SO_2N(R_1)CH_2CH_2$—
wherein n is 1 to about 20; g and t are each independently 1 to about 3; z is 0, 1 or 2; and $R_1$ is an alkyl of 1 to about 4 carbon atoms;

A is an aliphatic, cycloaliphatic, aromatic, or heterocyclic radical;

R is a $C_3$–$C_{20}$ linear, branched, or cyclic aliphatic group containing at least one ethylenically unsaturated double bond and optionally at least one phenyl group or phenyl group substituted with $C_1$–$C_6$ alkyl or halogen;

p is 2 to 3; and m is from about 0.8 to about 1.25 when p is 2, and m is from about 1 to about (p-1) when p is greater than 2.

The present invention further comprises a cured coating composition comprising the above defined coating composition after curing, said cured coating composition having an advancing hexadecane contact angle of at least 60 degrees.

The present invention further comprises a method of improving the oil repellency, water repellency, and cleanability of a cured alkyd or urethane coating composition comprising the addition to said coating composition prior to curing of an effective amount of a polyurethane of Formula II as defined above.

DETAILED DESCRIPTION OF THE INVENTION

The present invention comprises coating compositions comprising an alkyd or Type I urethane resin and at least one ethylenically unsaturated polyfluorourethane compound (hereinafter "polyfluorourethane additive") wherein a cured coating resulting from said coating composition has an advancing hexadecane contact angle of at least about 60 degrees.

By the term "alkyd coating," as used herein, is meant a conventional liquid coating based on alkyd resins, typically a paint, clear coating, or stain. The alkyd resins are complex branched and cross-linked polyesters containing unsaturated aliphatic acid residues. The alkyd coating cures by polymerization resulting from autoxidation of unsaturated bonds in the aliphatic acid by atmospheric oxygen.

By the term "urethane coating," as used herein, is meant a conventional liquid coating based on Type I urethane resins containing an autoxidizable binder, typically a paint, clear coating, or stain. Urethane coatings typically contain the reaction product of a polyisocyanate, usually toluene diisocyanate, and a polyhydric alcohol ester of drying oil acids. The urethane coating cures by air oxidation and polymerization of unsaturated drying oil residue in the binder.

By the term "coating composition," as used herein, is meant a liquid formulation of alkyd or Type I urethane resin, as applied to a substrate.

By the term "cured coating," as used herein is meant the final decorative and/or protective film obtained after the volatile components of a coating composition have evaporated and the polymerizations associated with the curing process are substantially completed.

By the term "durable oil repellency," as used herein, is meant that the increase in the hexadecane receding contact angle of the cured coating due to the presence of additive is substantially retained after cleaning according to the Detergent Wash Durability Test for 10 scrub cycles as described under Test Methods, below.

The contact angle formed between a surface and a drop of liquid is a measure of the wettability or repellency of the surface to the liquid. A wettable surface has low contact angles close to zero degrees; a repellent surface has higher contact angles. Thus the contact angle formed by an oily liquid such as hexadecane is widely used as a measure of the oil repellency of a surface. In general higher hexadecane contact angles indicate that a surface has greater dirt and soil resistance, oil repellency, and easier cleanability.

Contact angles are measured by the Sessile Drop Method which is described in A. W. Adamson, "The Physical Chemistry of Surfaces," Fifth Edition, Wiley & Sons, New York, 1990 and in Test Methods, below. Additional information on the equipment and procedure for measuring contact angles is provided by R. H. Dettre et al. in "Wettability", Ed. by J. C. Berg, Marcel Dekker, New York, 1993.

The relationship between water and organic liquid contact angles, and cleanability and dirt retention of surfaces is described in A. W. Adamson, above. In general, higher hexadecane contact angles are indicative that a surface has greater dirt and soil resistance, water repellency, and easier cleanability of the surface.

The polyfluorourethane additives of Formula II as defined above which are useful in the coatings and method of the present invention are prepared in two or three steps. In Step 1, a diisocyanate or triisocyanate of functionality p is reacted with a stoichiometric insufficiency of a fluoroalcohol reactant to yield an intermediate. In Step 2, the intermediate product of Step 1 is reacted with a slight excess of an ethylenically unsaturated alcohol to yield the desired polyfluorourethane. The ratio of fluoroalcohol to diisocyanate or triisocyanate is selected to maximize the yield of polyfluorourethane product containing segments from both the fluoroalcohol and the unsaturated alcohol. Step 3 is an optional additional step used when the unsaturated hydrocarbon alcohol is less volatile than the solvent and it is desired to strip unreacted alcohol and solvent from the polyfluorourethane product.

Ratios between about 1:0.8 to about 1.25:1 of fluoroalcohol to diisocyanate (wherein the functionality p is 2) are suitable for use herein. Overall performance and efficiency of use of the fluoroalcohol is diminished with ratios outside this range. The optimum stoichiometric ratio is one mole of fluoroalcohol per mole of diisocyanate. The slight excess of an ethylenically unsaturated alcohol is typically 5% to 10%, and the purpose of the slight excess is to ensure no detectable unreacted isocyanate groups remain in the final polyfluorourethane additive. Excess volatile ethylenically unsaturated alcohol may optionally be stripped off with the solvent. Procedures for this final stripping procedure when an ethylenically unsaturated alcohol less volatile than the solvent is used are described below.

In the case of triisocyanates (wherein the functionality p is 3), the optimum stoichiometric insufficiency of the fluoroalcohol reactant is p/2 moles of fluoroalcohol per mole of triisocyanate. Ratios between about 1 to about (p-1) are preferred. Overall performance and efficiency of use of the fluoroalcohol is diminished with ratios outside the preferred ranges. The slight excess of an ethylenically unsaturated alcohol is as described for diisocyanates.

The polyfluorourethane additives are prepared in a suitable solvent under anhydrous conditions, optionally stripped of solvent and unreacted volatiles, and mixed into an alkyd or Type I urethane coating composition in an amount sufficient to yield a cured coating containing from about 50 to about 10,000 µg fluorine per g cured coating. The cured coatings have increased soil resistance, increased oil repellency, increased water repellency, and improved cleanability.

The preparation of the polyfluorourethane additives involves the reaction of a di- or triisocyanate A(N=C=O)p wherein A and p are defined as in Formula I below, with about 1 mole of a fluoroalcohol $R_f$—X—OH wherein $R_f$ and X are as defined in Formula I below, to produce the intermediate product of Formula I

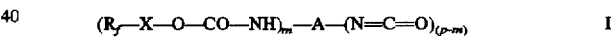

$$(R_f-X-O-CO-NH)_m-A-(N=C=O)_{(p-m)} \quad I$$

wherein

A is an aliphatic, cycloaliphatic, aromatic, or heterocyclic radical, p is 2 or 3, m is from about 0.8 to about 1.25 when p is 2 and preferably close to 1.0, and m is from about 1 to about (p-1) when p is greater than 2, and preferably close to p/2, $R_f$ is a $C_2$–$C_{20}$ linear or branched fluorocarbon chain, and X is —$(CH_2)_n$—, —$(CH_2)_gSO_2(CH_2)_t$—, or —$SO_2N(R_1)$—$CH_2CH_2$—, wherein n is 1 to about 20; g and t are each independently 1 to about 3; z is 0, 1 or 2; and $R_1$ is an alkyl of 1 to about 4 carbon atoms.

More particularly, A is a radical derived from an aliphatic, cycloaliphatic, aromatic or heterocyclic diisocyanate or triisocyanate having functionality p wherein p is 2 or 3. "Derived from" as used here means the radical left after removal of the terminal NCO groups. More particularly A is a $C_1$–$C_{16}$ alkyl; $C_1$–$C_{16}$ alkenyl; $C_1$–$C_{16}$ cycloalkyl optionally substituted with at least one $C_1$–$C_4$ alkyl; $C_1$–$C_{16}$ cycloalkenyl optionally substituted with at least one $C_1$–$C_4$ alkyl; phenyl optionally substituted with at least one $C_1$–$C_4$ alkyl or halogen; or isocyanurate optionally substituted with a divalent hydrocarbon group. A is also a radical defined by removal of the terminal NCO groups from 1) a diisocyanate or triisocyanate homopolymer, 2) isocyanurate trimer, or 3) extended diisocyanate. Examples are listed below in defining suitable isocyanate groups used in preparation of the polyfluorourethane additive useful in the present invention. More preferably A is a cyclohexyl or toluene radical.

More particularly $R_f$ is $C_qF_{(2q+1)}$ wherein q is 2 to about 20; preferred examples of $R_f$—X— include the following:

1) $F(CF_2)_q(CH_2)_n$— wherein q and n are as previously defined;

2) $F(CF_2)_qSO_2N(R_1)CH_2CH_2$— wherein q and R1 are as previously defined.

The use of a 1:1 mole ratio of the fluoroalcohol to diisocyanate or a p/2:1 ratio of fluoroalcohol to triisocyanate, maximizes the yield of final polyfluorourethane containing both the fluoroalcohol and unsaturated alcohol residues. Ratios within the ranges described above produce essentially equivalent results, but larger deviations can cause the polyfluorourethane derivative to be less effective.

The intermediate is then reacted with a slight excess of the unsaturated alcohol R—OH wherein R is defined as in Formula II below, to yield the polyfluorourethane additive of Formula II useful in the coating compositions of this invention:

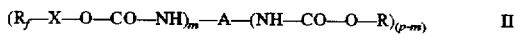

wherein

R is a $C_3$-$C_{20}$ linear, branched, or cyclic aliphatic group containing at least one ethylenically unsaturated double bond and optionally at least one phenyl group or phenyl group substituted with $C_1$-$C_6$ alkyl or halogen, and $R_f$, X, A, m and p are as previously defined for Formula I, provided that m and (p-m) are both at least 1.

While any diisocyanate or triisocyanate is suitable for use as the isocyanate reactant for the purposes of this invention, the preferred reactants are diisocyanates in which the isocyanate groups are differentiated in terms of reactivity with the fluoroalcohol, either electronically or by structural differences, following reaction with the first fluoroalcohol molecule.

Examples of preferred diisocyanates are isophorone diisocyanate (structural differentiation of reactivities), 2,4-toluene diisocyanate (electronic and structural differentiation of reactivities), and 2,6-toluene diisocyanate (electronic differentiation of reactivities). Alternative names for these compounds are 2,4-tolylene and 2,6-tolylene diisocyanates.

The isocyanate groups in isophorone diisocyanate (isomeric mixture of 5-isocyanato-1-(isocyanatomethyl)1,3,3-trimethylcyclohexane) are structurally dissimilar since they are linked to a secondary carbon atom in the ring and to a primary noncyclic carbon atom, respectively. Consequently the isocyanate groups show different reactivities with the fluoroalcohol. The relative reactivity of the isocyanate groups can also be influenced by the catalyst used. The preparation of the intermediate product using 1,4-diazabicyclo[2.2.2]octane (DABCO) catalyst is:

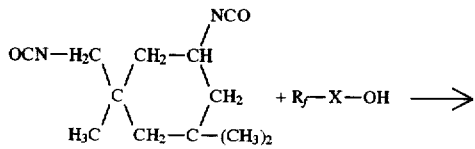

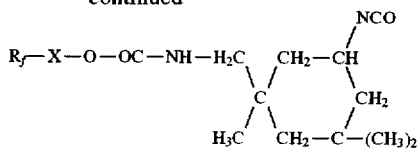

while with dibutyltindilaurate or without a catalyst the preparation of the intermediate product is:

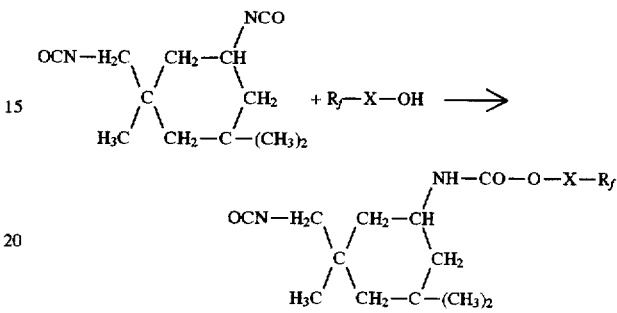

2,4-Toluene diisocyanate reacts more readily with the first mole of fluoroalcohol since the first substitution substantially deactivates the second isocyanate group to further reaction.

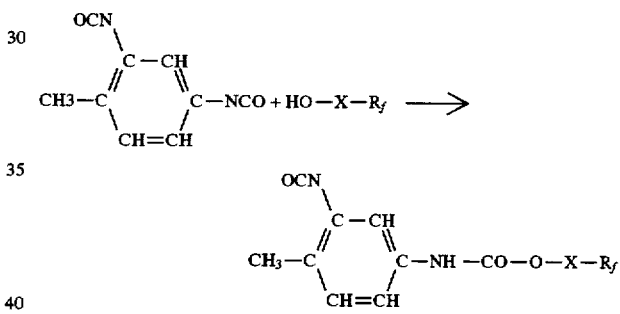

Subsequent reactions of the intermediate of Formula I with the unsaturated alcohol gives high yields of the desired products of Formula II:

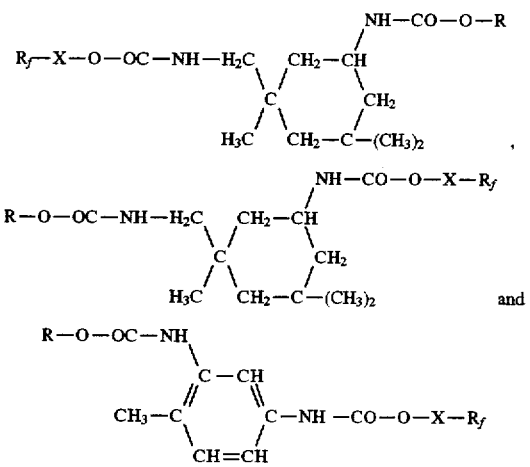

Although the differentiation in reactivity is much stronger for the toluene diisocyanates than for isophorone diisocyanate, the toluene diisocyanate reaction products tend to be associated with undesirable color formation and ultraviolet light instability.

In contrast to the two preferred diisocyanates above, and thus less preferred, trimethyl-1,6-diisocyanatohexane (a mixture of 2,2,4–2,4,4-isomers) and 1,3 -bis(1-isocyanato-1-methylethyl)benzene are also suitable for use herein. Since in these latter cases the reactivities of the isocyanate groups before and after the reaction with the fluoroalcohol are approximately equal, it can readily be seen that the intermediate corresponding to Formula I,

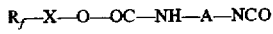
$R_f$—X—O—OC—NH—A—NCO is approximately as likely to further react in the first stage of the reaction with fluoroalcohol as is unreacted diisocyanate. Consequently, the reaction product from reacting equimolar amounts of fluoroalcohol and diisocyanate will contain two products and unreacted diisocyanate in approximately the amounts indicated:

1a. 50 mole % $R_f$—X—O—OC—NH—A—NCO
2a. 25 mole % $R_f$—X—O—OC—NH—A—NH—CO—O—X—$R_f$
3a. 25 mole % OCN—A—NCO.

On subsequent reaction with the unsaturated alcohol R—OH the above intermediates yield respectively:

1b. 50 mole % $R_f$—X—O—OC—NH—A—NH—CO—O—R
2b. 25 mole % $R_f$—X—O—OC—NH—A—NH—CO—O—X—$R_f$
3b. 25 mole % R—O—OC—NH—A—NH—CO—O—R.

Only sequence 1a–1b yields the desired product corresponding to Formula II. Fluoroalcohol reacted as in sequence 2a–2b yields a product that does not chemically bond to the cured resin of the coating composition and thus does not contribute to durable oil repellency in the cured coating composition. Additionally, there is some indication that the reaction product from sequence 2a–2b competes for surface area during curing with the desired additive, reducing the effectiveness of the desired additive. Sequence 3a–3b yields a product that does not contribute to oil repellency.

For diisocyanates or triisocyanates without differentiation, if the molar ratio of fluoroalcohol to isocyanate is x:y, and the functionality of the isocyanate is p, then the statistical probability for the production of polyfluorourethane products containing both fluoroalcohol and unsaturated alcohol residues is:

$$\frac{(x+y)^p - x^p - y^p}{(x+y)^p}$$

This function is maximized when x=y, and the yield decreases slowly at first as the absolute value of (x−y) exceeds zero. The function indicates the yield decreases more rapidly as the absolute value of (x−y) continues to increase, becoming zero when either x or y becomes zero.

Di- and triisocyanates which are suitable for use in the practice of this invention include aliphatic, cycloaliphatic, arylaliphatic, aromatic, and heterocyclic di- and triisocyanates. Many such diisocyanates are included in a description by W. Siefken in Justus Liebig's Annalen de Chemie, 562, pages 75 to 136, (1949).

Examples of such suitable diisocyanates include 1,4-tetramethylene diisocyanate; 1,4- and/or 1,6-hexamethylene diisocyanate; 1,12-dodecane diisocyanate; cyclobutane-1,3-diisocyanate; cyclohexane-1,3- and 1,4-diisocyanate and mixtures of these isomers; 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthalene-1,5-diisocyanate; 1,3- and 1,4-xylylene diisocyanates; 4,4'-methylene-bis(cyclohexyl isocyanate); 4,4'-isopropyl-bis(cyclohexyl isocyanate); 1,4-cyclohexyl diisocyanate; 3-isocyanatomethyl-3,5,5-trimethylcyclohexyl isocyanate; 1-methoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate; and 4-(2-isocyanatocyclohexyl-methyl)-phenyl isocyanate; and mixtures thereof.

Suitable commercially available diisocyanates with the preferred differentiated reactivities are exemplified by MONDUR TDS (98% toluene 2,4-diisocyanate), MONDUR TD-80 (a mixture of 80% 2,4- and 20% 2,6-toluene diisocyanate isomers), each available from Bayer Corporation, Pittsburgh, Pa., and isophorone diisocyanate (5-isocyanato-1-(isocyanatomethyl)-1,3,3-trimethylcyclohexane) available from Aldrich Chemical Co., Milwaukee, Wis. Suitable commercially available diisocyanates with essentially undifferentiated reactivities and which are thus less preferred are exemplified by DESMODUR H (1,6-hexamethylene diisocyanate), DESMODUR W (bis[4- isocyanatocyclohexyl]methane), MONDUR M (4,4'-diisocyanatodiphenylmethane), each available from Bayer Corporation, Pittsburgh, Pa., "tetramethylxylene diisocyanate" or 1,3-bis(1-isocyanato-1-methylethyl)benzene available from American Cyanamid Co., Wayne, N.J., and a mixture of 2,2,4- and 2,4,4-trimethyl-1,6-diisocyanatohexanes available from Aldrich Chemical Co., Milwaukee, Wis.

Certain diisocyanates, for example hexamethylene diisocyanate and 4,4'-diisocyanato-biphenyl, are less preferred since they yield polyfluorourethane additives with poor solubility. A possible explanation is that the relatively linear structures allow self-association. While this property can, to some extent, be overcome by the addition of leveling agents and plasticizers, and the use of stronger solvents such as acetone, uniform dispersion of the polyurethane additive in the coating composition is made more difficult. Incomplete or nonuniform dispersion of a polyfluorourethane additive in a coating composition can result in an incomplete distribution of fluorocarbon residues on the surface of the cured coating, lower hexadecane contact angles, and impaired water and oil repellency.

Also suitable for use herein are hydrocarbon diisocyanate-derived isocyanurate trimers which can be represented by the formula:

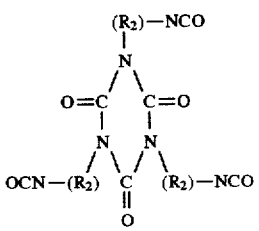

wherein $R_2$ is a divalent hydrocarbon group, preferably aliphatic, alicyclic, aromatic, or arylaliphatic. For example, $R_2$ is hexamethylene, toluene, or cyclohexylene, preferably the former which is available as DESMODUR N-3300 from Bayer Corporation, Pittsburgh, Pa. Other triisocyanates useful for the purposes of this invention are those obtained by reacting three moles of toluene diisocyanate with 1,1,1-tris-(hydroxymethyl)ethane or 1,1,1-tris-(hydroxymethyl)propane. The isocyanurate trimer of toluene diisocyanate and that of 3-isocyanatomethyl-3,4,4-trimethylcyclohexyl isocyanate are other examples of triisocyanates useful for the purposes of this invention, as is methine-tris-(phenylisocyanate).

Diisocyanates and triisocyanates are preferred over polyisocyanates having four or more isocyanate groups. Mixtures of hexamethylene diisocyanate homopolymers having the formula:

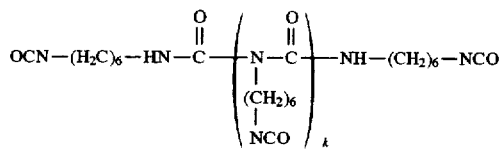

wherein k is a positive integer are commercially available, for instance as DESMODUR N-100 from Bayer Corporation, Pittsburgh Pa. While the single homopolymer having k=1 would be expected to be suitable for preparing the polyfluorourethane additives used in the present invention, this specific homopolymer is only available in admixture with substantial amounts (50% or more) of homopolymers having k greater than 1, i.e., substantial amounts of tetra- and higher polyisocyanates. Polyfluorourethane additives prepared from polyisocyanates with functionality greater than 3 are relatively less effective in providing durable oil repellency than those prepared from di- and triisocyanates.

Another suitable preformed and commercially available triisocyanate is exemplified by CYTHANE 3160, a reaction product of 1,1,1-tris(hydroxymethyl)propane and m-tetramethylxylene diisocyanate, available from American Cyanamid, Stamford Conn.

The di- or triisocyanate is first reacted with a fluoroalcohol. A number of fluorinated alcohols are available commercially, and some are listed below. Several perfluoroalkylethanols are available as ZONYL Fluorotelomer Intermediates from E. I. du Pont de Nemours and Company, Wilmington Del. These products are mixtures of alpha-fluoro-omega-(2-hydroxyethyl)-poly(difluoromethylene) homologues of the formula:

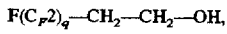

wherein the values of q are shown in Table 1 below.

TABLE 1

| ZONYL Fluorotelomer Intermediates, Homologue Weight Percent Compositions | | | |
|---|---|---|---|
| Value of q | ZONYL BA-L | ZONYL BA | ZONYL BA-N |
| q = 4 | 0–3 | 0–1 | |
| q = 6 | 43–53 | 27–37 | 0–5 |
| q = 8 | 29–35 | 29–34 | 45–52 |
| q = 10 | 9–14 | 16–21 | 26–32 |
| q = 12 | 2–5 | 7–13 | 10–14 |
| q = 14 | 0–2 | 3–6 | 2–5 |
| q = 16 | 0–1 | 0–2 | 0–2 |
| q = 18 | 0–1 | 0–1 | 0–1 |

Other perfluoroalkyl alcohols are also suitable for use in the present invention, such as 2-(N-methyl perfluorooctane sulfonamido)ethanol, available commercially as FX-42 from Dainippon Ink and Chemicals, Inc., Tokyo, Japan.

The polyfluorourethane additives used in the compositions and method of this invention can be made from individual fluoroalcohols and unsaturated alcohols or from mixtures of fluorinated alcohols and mixtures of unsaturated alcohols.

The intermediate resulting from the reaction of the di- or triisocyanate and fluorinated alcohol is then reacted with a slight excess of an unsaturated alcohol. Requisite unsaturated alcohols, such as allyl alcohol (2-propen-1-ol), soya alcohol, and crotonyl alcohol (2-buten-1-ol), are commercially available, for example from Aldrich Chemical Co., Milwaukee, Wis.

When the slight excess of unsaturated alcohol has been reacted in Step 2 or Step 3, the reaction mixture may be analyzed for fluorine and added directly to the coating composition if the small amounts of unreacted unsaturated alcohol and solvent in the reaction mixture are compatible with the coating composition. For characterization purposes, most of the polyfluorourethane products in the examples were vacuum-stripped, analyzed, and redissolved before mixing with the coating composition. If the unsaturated alcohol has a volatility similar to that of the solvent, vacuum-stripping also removes the excess unsaturated alcohol. In cases where the unsaturated alcohol is not sufficiently volatile to be vacuum-stripped and residual unsaturated alcohol is not acceptable, the three-step process is used to prepare the additive. Step 1, reaction of the fluoroalcohol and diisocyanate in a 1:1 molar mixture, is as previously described and unchanged. Step 2, reaction of the intermediate of Formula I with the unsaturated alcohol, is modified to use a slight insufficiency (e.g., 90%) of the unsaturated alcohol if it is less volatile than the solvent. In Step 3 the small amount of unreacted isocyanate remaining is reacted with a slight excess of a volatile unsaturated alcohol, e.g., 2-propen-1-ol. The final vacuum-stripping now removes solvent and excess volatile unsaturated alcohol. For safety and toxicity reasons, the polyfluorourethane additive should not contain unreacted isocyanate groups when it is added to the coating composition.

Suitable solvents for the preparation of the polyfluorourethane additives are exemplified by ketones such as methylisobutylketone, methylamylketone, methylethylketone, esters such as ethyl acetate, and aromatic solvents such as toluene or xylene. The polyfluorourethane additives useful in this invention are typically solids, thus the use of a solvent is necessary for the synthesis of the polyfluorourethane and for mixing the polyfluorourethane additive uniformly into the coating composition.

The preferred order of reaction of the fluoroalcohol and the unsaturated alcohol is to react the fluoroalcohol with the diisocyanate or triisocyanate first. This maximizes the utilization of the fluoroalcohol. Those skilled in the art will recognize that other sequences will yield essentially the same product and the invention is not limited by the specific reaction sequences described. Suitable catalysts are added to promote reaction of the isocyanate with the first alcohol reacted. Typically, the second alcohol reaction is completed at the same or higher temperature, and additional catalyst is not needed for the second alcohol reaction.

Suitable catalysts are well known to those skilled in the art. For instance, the catalyst is a metal organic exemplified by dibutyltindiacetate, dibutyltindi-2-ethylhexoate, dibutyltindilaurate, dibutyltinoxide, or a tertiary amine, exemplified by triethylamine, tributylamine, triethylenediamine, tripropylamine, and the like, pyridine, ethyl morpholine, 1,4-diazabicyclo[2.2.2]octane (DABCO, Aldrich Chemical Co., Milwaukee, Wis.) or 1,8-diazabicyclo[5.4.0]undec-7-ene (DBU, Aldrich Chemical Co., Milwaukee, Wis.). The amount of catalyst used, typically dibutyltindilaurate alone or as a solution in methylisobutylketone, is small, e.g., in the range of 2–10 parts per 10,000 parts (0.02–0.1%) by weight of the isocyanate.

Excess volatile unsaturated alcohol and reaction solvent may be optionally stripped off from the reaction mixture, for instance for the purpose of characterizing the polyfluorourethane additive. The polyfluorourethane additive should be redissolved to facilitate uniform mixing in the coating composition.

The polyfluorourethane additives of Formula II are incorporated into conventional curable coating compositions. The coating compositions of this invention contain a mixture of an alkyd coating composition or a Type I urethane coating composition and sufficient polyfluorourethane additive such that the coating composition contains from about 50 to about 10,000 µg fluorine, and preferably from about 150 to about 5,000 µg fluorine, per g of the non-volatile content of the composition.

The polyfluorourethane additives can be added to the coating composition after dissolution in a compatible solvent. Pre-dissolving provides a method to insure the polyfluorourethane additives are readily and completely mixed in the coating composition. Alternatively, the reaction mixture in which the polyfluorourethane additives were synthesized is used, without isolation of the polyfluorourethane additive, provided any reaction solvents were chosen to be appropriate for the final coating composition to ensure homogeneity. Suitable solvents are those previously listed for the synthesis of the polyfluorourethane additive. Other solvents, such as acetone, are also suitable for use if the solubility of the polyfluorourethane is low. The use of volatile solvents such as acetone should, however, be kept to a minimum to avoid lowering the flash point of the coating composition. Alternatively, it is understood that the formulation of the coating composition can be modified when the polyfluorourethane additives are added.

The addition of the polyfluorourethane additive can be made to a preformulated coating composition at the point of sale or use, but is preferably made at the time of manufacture of the alkyd or Type I urethane coating composition, when appropriate quality control procedures are more readily available.

Methods of application of the coating compositions to surfaces, and the curing properties of the coating compositions are essentially unaffected by the addition of the polyfluorourethane additive.

The cured coating of this invention resulting from a coating composition containing an additive of Formula II has durable oil repellency as indicated by an increase in hexadecane contact angles compared to a coating composition without the additive. This increase in hexadecane contact angles is substantially retained after the Wash Durability Test (Method 3) described under Test Methods, below. The cured coating compositions of the present invention have an advancing hexadecane contact angle of at least 60 degrees, preferably at least 70 degrees. Coatings without the polyfluorourethane additive have a much lower hexadecane contact angle, typically 20–35 degrees.

While not wishing to be bound by theory, it is believed that the mechanism whereby the advantageous properties of the cured compositions of this invention are generated is via bonding of the polyfluorourethanes into the coating during curing. It is believed that the polyfluorourethane additives used in this invention, when applied to a surface as part of a liquid coating composition, migrate to the coating surface before curing, becoming concentrated at the surface, and are chemically bound into the coating during curing, thus providing durable oil and water repellency to the cured coating.

The retention or durability of oil repellency after cleaning is indicated by retention of the receding hexadecane contact angle. For the cured coatings of the present invention the receding hexadecane contact angle is at least 30 degrees, preferably at least 40 degrees, after washing according to the Detergent Wash Durability Test for 10 scrub cycles as described below. Comparative Examples prepared using a saturated hydrocarbon alcohol (R'—OH wherein R' is the saturated form of R) do not retain oil repellency after the wash durability test.

The present invention further comprises a method of improving the oil repellency of a cured alkyl or urethane Type I coating composition comprising adding to said coating composition prior to curing an effective amount of a polyfluorourethane of Formula II as previously described above. The polyfluorourethane additive is added to the alkyd or urethane resin as described above in an amount such that the coating composition contains from about 50 to 10,000 µg fluorine, preferably 150 to 5,000 µg fluorine, per g of the non-volatile content of the composition. The cured coating resulting from the coating compositions of this method have an advancing hexadecane contact angle of at least 60 degrees, preferably at least 70 degrees.

The polyfluorinated urethanes are useful as components of the coating compositions of the present invention. Such coating compositions cure by conventional methods, and the cured coatings of the present invention exhibit several valuable properties. Specifically, the cured coatings of this invention, compared with the conventional cured coatings, exhibit improved anti-blocking properties, and improved oil and water repellency, as demonstrated by contact angle measurements. The improved oil and water repellency results in improved soil resistance and cleanability of the surface of the cured coating. The coating compositions of the present invention are useful as paints, clear coats, and stains for coating a wide variety of surfaces. The method of the present invention is useful to provide coating compositions and cured coating compositions having these properties.

TEST METHODS

Method 1—Preparation of Coating Compositions and Test Samples

A solution of the polyfluorourethane sample was dissolved in methylisobutylketone and mixed into the base coating composition in an amount sufficient to give a 500 µg or 1000 µg fluorine concentration per g of the coating composition. The resulting fluorourethane-containing coating composition and a control containing no added polyfluorourethane were cast on a Leneta P-121-10N dull black scrub test panel, allowed to cure for 7 days under ambient conditions, and the coating evaluated by Test Methods 2, 3, and 4 as described below. The results are shown in Tables 4 to 8.

Method 2—Contact Angle

Contact angles are measured by the Sessile Drop Method which is described by A. W. Adamson in "The Physical Chemistry of Surfaces," Fifth Edition, Wiley & Sons, New York, 1990. Additional information on the equipment and procedure for measuring contact angles is provided by R. H. Dettre et al. in "Wettability," Ed. by J. C. Berg, Marcel Dekker, New York, 1993.

In the Sessile Drop Method, a Rame-Hart optical bench, available from Rame Hart, Inc., Mountain Lakes, N.J., is used to hold the substrate in the horizontal position. The contact angle is measured at a prescribed temperature with a telescoping goniometer from the same manufacturer. A drop of test liquid is placed on a surface and the tangent is precisely determined at the point of contact between the drop and the surface. An advancing angle is determined by increasing the size of the drop of liquid and a receding angle is determined by decreasing the size of the drop of liquid. The data are presented typically as advancing and receding contact angles.

The relationship between water and organic liquid contact angles, and cleanability and dirt retention of surfaces is described in A. W. Adamson, above. In general, higher hexadecane contact angles are indicative that a surface has greater dirt and soil resistance and repellency, and easier cleanability of the surface.

The indication for durable oil repellency is that a receding hexadecane contact angle of at least 30 degrees is retained in a cured coating containing 500 µg fluorine per gram of coating composition following surface cleaning according to Method 3 using 10 scrub cycles.

The water and hexadecane advancing and receding contact angles of the coating compositions of the present invention were measured on coatings cast on 16.5 cm×43 cm (6.5×17 inch) Leneta P-121-10N dull black, scrub test panels, available from Leneta Co., Mahwah, N.J. The coating compositions were prepared as described above with the polyfluorourethane additive added in an amount to give a 500 µg/g or 1000 µg/g fluorine concentration in the blended product. The polyfluorourethane-containing coating composition was applied to the Leneta test panel using a 7 mil film caster. The test panel was anchored to a Gardco DP-1218L Leveling Drawdown Plate and was cleaned before coating by wiping with cheesecloth wetted with isopropyl alcohol. The coated panel was cured for seven days at ambient room conditions before testing. The results are shown in Tables 4–8.

Method 3—Detergent Wash Durability

Wash durability of the polyfluorourethane-containing coating composition to surface cleaning was determined using a Gardco Model D10 Wash & Wear Tester (Paul N. Gardner Co., Pompano Beach, Fla.) and a Gardco WA-2225 abrasion boat. A 16.5 cm×2.5 cm (6.5×1 inch) test strip cut from the coated Leneta test panel was positioned on the test sample tray and fastened thereto with 1.9 cm (¾ inch) wide transparent tape such that about a 5 cm×1.9 cm (2×¾ inch) portion of the coated test panel would be scrubbed. The abrasion boat base plate was covered with a folded 23 cm×23 cm (9×9 inch) piece of DeRoyal Textiles Idealfold bleached grade 20B cotton cheese cloth, available from DeRoyal Textiles, Camden S.C. The cheesecloth was folded perpendicularly to the seam in half and half again and was fastened to the base plate such that the scrubbing surface layers were seam free. The cheesecloth pad was wetted with 20 ml of a 1% aqueous Tide detergent (Proctor and Gamble Co., Cincinnati Ohio) solution before the test strip was scrubbed. The test strip was removed after the appropriate number (at least 10) of scrub cycles, water washed free of the Tide solution and air dried one day before advancing and receding hexadecane contact angles were measured on the scrubbed surface. The results are shown in Tables 4–8.

Method 4—Anti-Blocking Test

ASTM 4946-89 provides a method for measuring the anti-blocking (non-stick) properties of surface coatings. The painted surfaces of flat panels are placed face-to-face. A No. 8 stopper is placed atop the pair, and a 1000 g weight is placed atop the stopper, creating a pressure of 1.8 psi (12.4 KPa). The weighted pair is held for 30 minutes at 120°±5° F. (49°±3° C.), then cooled at room temperature for 30 minutes. Samples are then peeled and tack rating noted. The blocking resistance is assessed according to the Table 2 below:

TABLE 2

ASTM 4946-89 Anti-Blocking Test Ratings

| Blocking Resistance Numerical Ratings | Type of Separation | Performance |
|---|---|---|
| 10 | no tack | perfect |
| 9 | trace tack | excellent |
| 8 | very slight tack | very good |
| 7 | very slight to slight tack | good to very good |
| 6 | slight tack | good |
| 5 | moderate tack | fair |
| 4 | very tacky; no seal | poor to fair |
| 3 | 5–25% seal | poor |
| 2 | 25–50% seal | poor |
| 1 | 50–75% seal | very poor |
| 0 | 75–100% seal | very poor |

The general procedure of ASTM 4946-89 was used to measure the anti-blocking properties of the coating compositions of this invention as a function of cure days. The measurements were made using 1.5×1.5 inch (3.8×3.8 cm) sections cut from coated Leneta scrub test panels prepared as described above. The results are shown in Tables 5–8.

EXAMPLES

Materials

The following materials were used in the Examples. The identifiers below, e.g., "P1" for Benjamin Moore IMPERVO White Alkyd High Gloss Enamel or "H1" for 2-propen-1-ol, used to identify reactants in Table 3.

1. Paints

P1. Benjamin Moore IMPERVO White Alkyd High Gloss Enamel (from Benjamin Moore and Company, Montvale, N.J.)

P2. Moore's Gloss Finish Outside White House Paint (alkyd) (from Benjamin Moore and Company, Montvale, N.J.)

P3. DURON Exterior Alkyd House Paint (white) (from Duron, Inc. Beltsville, Md.)

P4. ENTERPRISE Gloss Polyurethane (from Valspar Corporation, Wheeling, Ill.)

2. Unsaturated Hydrocarbon Alcohols

H1. 2-propen-1-ol (from Aldrich Chemical Co., Milwaukee, Wis.)

H2. 2-methyl-2-propen-1-ol (from Aldrich Chemical Co., Milwaukee, Wis.)

H3. 2-buten-1-ol (from Aldrich Chemical Co., Milwaukee, Wis.)

H4. 3-methyl-3-buten-1-ol (from Fisher Scientific, Pittsburgh, Pa.)

H5. 2,4-hexadien-1-ol (from Fisher Scientific, Pittsburgh, Pa.)

H6. oleyl alcohol (from Aldrich Chemical Co., Milwaukee, Wis.)

H7. HENKEL 3318 (from Henkel Corporation, Cincinnati, Ohio, a fatty alcohol mixture of iodine value 122.5, containing about 8% 1-hexadecanol, 6% 1-octadecanol, 40% 1-octadecenols including oleyl alcohol, and 46% 1-octadecadienols including linoleyl alcohol, by GC/MS analysis H8. 3-phenyl-2-propen-1-ol (from Fisher Scientific, Pittsburgh, Pa.)

3. Saturated Hydrocarbon Alcohols (for Saturated Comparative Examples)

S1. 1-propanol (from Aldrich Chemical Co., Milwaukee, Wis.)

S2. 2-methyl-1-propanol (from Aldrich Chemical Co., Milwaukee, Wis.)

S3. 1-butanol (from Aldrich Chemical Co., Milwaukee, Wis.)

S4. 3-methyl-1-butanol (from Aldrich Chemical Co., Milwaukee, Wis.)

S5. 1-hexanol (from Aldrich Chemical Co., Milwaukee, Wis.)

S6. 1-octadecanol (from Aldrich Chemical Co., Milwaukee, Wis.)

S7. benzyl alcohol (from Aldrich Chemical Co., Milwaukee, Wis.)

4. Isocyanates

I1. Cyclohexylisocyanate (from Aldrich Chemical Co., Milwaukee, Wis.)

I2. Phenyl isocyanate (from Aldrich Chemical Co., Milwaukee, Wis.)

I3. Trimethyl-1,6-diisocyanatohexane (a mixture of 2,2,4- and 2,4,4-isomers from Aldrich Chemical Co., Milwaukee, Wis.)

I4. m-Tetramethylxylene diisocyanate (TMXDI, from American Cyanamid Company, Wayne, N.J.)

I5. Isophorone diisocyanate (from Aldrich Chemical Co., Milwaukee, Wis.)

I6. 2,4-Toluene diisocyanate (MONDUR TDS from Bayer Corporation, Pittsburgh, Pa.)

I7. Mixed 2,4- and 2,6-toluene diisocyanates (80/20 ratio, MONDUR TD-80, from Bayer Corporation, Pittsburgh, Pa.)

I8. Isocyanurate trimer derived from hexamethylene diisocyanate (DESMODUR N-3300, from Bayer Corporations, Pittsburgh, Pa.)

5. Fluoroalcohols

F1. ZONYL BA Fluorotelomer Intermediate from E. I. du Pont de Nemours and Company, Wilmington, Del., as described in Table 1 above).

F2. FX—42 2-(N-methyl perfluorooctane sulfonamido) ethanol, from Dainippon Ink and Chemicals, Inc., DIC Bldg, 7-20 Nikonbashi, 3-chome, Chuo-ku, Tokyo 103, Japan)

Example 1—Two Step Polyfluorourethane Additive Preparation

A 250-ml, 4-necked round-bottom flask, equipped with a mechanical agitator, temperature control device, pressure equalizing addition funnel, condenser, and nitrogen inlet/outlet was charged with 22.30 g (0.10 mole) isophorone diisocyanate, 47.48 g (0.10 mole) ZONYL BA and 17.25 g dry methylisobutylketone. Dibutyltindilaurate (0.016 g) was added to the stirred, nitrogen purged mixture, which, after the resultant exotherm, was held at about 45° C. for about 2 hours (Step 1), and then treated with 6.39 g (0.11 mole) 2-propen-1-ol and stirred for an additional 2 hours at about 75° C. (Step 2). The resultant reaction mass was vacuum stripped of most solvent and unreacted hydrocarbon alcohol to obtain a product containing 42.3% fluorine by combustion analysis.

Examples 2–8 and Comparative Examples A–D and K–M

Examples 2–8 and Comparative Examples A–D and K–M were prepared by the procedure of Example 1, with specific reaction times, temperatures, and reactants as listed in Table 3 below.

Example 9—Three Step Polyfluorourethane Additive Preparation

A 250-ml, 4-necked round-bottom flask, equipped with a mechanical agitator, temperature control device, pressure equalizing addition funnel, condenser, and nitrogen inlet/outlet was charged with 22.28 g (0.10 mole) isophorone diisocyanate, 47.42 g (0.10 mole) ZONYL BA and 17.7 g dry methylisobutylketone. Dibutyltindilaurate (0.016 g) was added to the stirred, nitrogen purged mixture, which, after the resultant exotherm, was held at about 45° C. for about 2 hours (Step 1), and then treated with 8.86 g (0.09 mole) 2,4-hexadien-1-ol and stirred at about 75° C. for about 4 hours (Step 2), then treated with 1.18 g (0.02 mole) 2-propen-1-ol and stirred at about 75° C. for about 1 hour. The resultant reaction mass was vacuum stripped of most solvent and unreacted hydrocarbon alcohol to obtain a product containing 38.7% fluorine by combustion analysis.

Examples 10–17 and Comparative Examples E–J

Examples 10–17 and Comparative Examples E–J were prepared by the procedure of Example 9, with specific reaction times, temperatures, and reactants as listed in Table 3 below.

Examples 18–23

Examples 18–23 were prepared by the procedure of Example 1, with specific reaction times, temperatures, and reactants as listed in Table 3 below.

Example 24—Preparation of a Polyfluorourethane Additive Using an Isocyanurate Trimer and 2-propen-1-ol A 250-ml, 4-necked round-bottom flask, equipped with a mechanical agitator, temperature control device, pressure equalizing addition funnel, condenser, and nitrogen inlet/outlet was charged with 40.29 g (0.20 equivalents of the active ingredient) the isocyanurate trimer derived from hexamethylene diisocyanate (DESMODUR N-3300), 47.44 g (0.10 mole) ZONYL BA and 23.41 g dry methylisobutylketone. Dibutyltindilaurate (0.016 g) was added to the stirred, nitrogen purged mixture, which, after the resultant exotherm, was held at about 65° C. for about 2 hours (Step 1), and then treated with 6.43 g (0.11 mole) 2-propen-1-ol and stirred at about 85° C. for an additional 2 hours (Step 2). The resultant reaction mass was vacuum stripped of most solvent and unreacted hydrocarbon alcohol to obtain a product containing 26.7% fluorine by combustion analysis.

TABLE 3

Synthesis Detail for Example and Comparative Example

| Example | Step 1 —NCO Id^c | mol | R_fOH Id^c | mol | tmp °C. | time hr | Step 2 ROH Id^c | mol | tmp °C. | time hr | Step 3 ROH Id^c | mol | tmp °C. | time hr | %F |
|---|---|---|---|---|---|---|---|---|---|---|---|---|---|---|---|

Polyfluorourethane additives from isophorone diisocyanate, fluoroalcohol, and volatile hydrocarbon alcohol.
Two step reaction with final vacuum stripping:

| 1 | I5 | 0.10 | F1 | 0.10 | 45 | 2 | H1 | 0.11 | 75 | 2 | -- no Step 3 -- | | | | 42.3 |
| 2 | I5 | 0.10 | F1 | 0.10 | 45 | 2 | H2 | 0.11 | 75 | 3.5 | -- no Step 3 -- | | | | 40.8 |
| 3 | I5 | 0.10 | F1 | 0.10 | 45 | 2 | H3 | 0.11 | 75 | 3 | -- no Step 3 -- | | | | 40.7 |
| 4 | I5 | 0.10 | F1 | 0.10 | 45 | 2 | H4 | 0.11 | 75 | 4 | -- no Step 3 -- | | | | 39.2 |

Polyfluorourethane additives from 2,4-toluene diisocyanate, fluoroalcohol, and volatile hydrocarbon alcohol.
Two step reaction with final vacuum stripping:

| 5 | I6 | 9.10 | F1 | 0.10 | 90 | 2 | H1 | 0.11 | 90 | 2 | -- no Step 3 -- | | | | 45.1 |
| 6 | I6 | 0.128 | F1 | 0.128 | 60 | 2 | H2 | 0.141 | 75 | 2 | -- no Step 3 -- | | | | 44.6 |
| 7 | I6 | 0.104 | F1 | 0.104 | 60 | 2 | H3 | 0.114 | 60 | 2 | -- no Step 3 -- | | | | 42.7 |
| 8 | I6 | 0.10 | F1 | 0.10 | 55 | 3 | H4 | 0.11 | 75 | 2 | -- no Step 3 -- | | | | 41.7 |

Polyfluorourethane additives from isophorone diisocyanate, fluoroalcohol,
and hydrocarbon alcohol less volatile than the solvent.
Three step reaction with final vacuum stripping:

| 9 | I5 | 0.10 | F1 | 0.10 | 45 | 2 | H5 | 0.09 | 75 | 4 | H1 | 0.02 | 75 | 1 | 38.7 |
| 10 | I5 | 0.10 | F1 | 0.10 | 45 | 2 | H6 | 0.09 | 75 | 2 | H1 | 0.02 | 75 | 1 | 33.2 |
| 11 | I5 | 0.10 | F1 | 0.10 | 45 | 2 | H7 | 0.09 | 75 | 3 | H1 | 0.02 | 75 | 2 | 33.5 |
| 12 | I5 | 0.10 | F1 | 0.10 | 45 | 2 | H8 | 0.09 | 75 | 4 | H1 | 0.02 | 75 | 1.5 | 37.9 |

Polyfluorourethane additives from 2,4-toluene diisocyanate, fluoroalcohol,
and hydrocarbon alcohol less volatile than the solvent.
Three step reaction with final vacuum stripping:

| 13 | I6 | 0.10 | F1 | 0.10 | 75 | 3 | H5 | 0.09 | 75 | 3 | H1 | 0.02 | 75 | 2 | 41.6 |
| 14 | I6 | 0.10 | F1 | 0.10 | 90 | 2 | H6 | 0.09 | 90 | 2 | H1 | 0.02 | 90 | 2 | 34.4 |
| 15 | I6 | 0.10 | F1 | 0.10 | 60 | 3 | H7 | 0.02 | 75 | 2 | H1 | 0.02 | 75 | 2 | 35.5 |
| 16 | I6 | 0.10 | F1 | 0.10 | 90 | 1.5 | H8 | 0.09 | 90 | 17 | H1 | 0.02 | 90 | 3 | 40.3 |
| 17 | I6 | 0.10 | F2 | 0.10 | 75 | 2 | H5 | 0.09 | 75 | 3 | H1 | 0.02 | 75 | 1 | 35.5 |

Polyfluorourethane additives from other isocyanates, fluoroalcohol,
and volatile hydrocarbon alcohol. Two step reaction with final vacuum stripping:

| 18 | I7 | 0.10 | F1 | 0.10 | 85 | 2 | H1 | 0.11 | 85 | 2 | -- no Step 3 -- | | | | 44.4 |
| 19 | I7 | 0.10 | F1 | 0.10 | 60 | 2 | H3 | 0.11 | 60 | 2 | -- no Step 3 -- | | | | 43.8 |

Replicate of Example 1, prepared without vacuum stripping.

| 20 | I5 | 0.10 | F1 | 0.10 | 45 | 2 | H1 | 0.11 | 80 | 3 | -- no Step 3 -- | | | | 36.2 |

Polyfluorourethane additives from other isocyanates, fluoroalcohol,
and volatile hydrocarbon alcohol.
Two step reaction with final vacuum stripping:

| 21 | I4 | 0.10 | F1 | 0.10 | 75 | 3 | H1 | 0.11 | 75 | 3 | -- no Step 3 -- | | | | 40.0 |
| 22 | I3 | 0.138 | F1 | 0.138 | 75 | 3 | H1 | 0.152 | 75 | 2 | -- no Step 3 -- | | | | 42.1 |
| 23 (a, b) | I8 | 0.20 | F1 | 0.10 | 65 | 2 | H1 | 0.11 | 85 | 2 | -- no Step 3 -- | | | | 31.2 |
| 24 (a) | I8 | 0.20 | F1 | 0.10 | 65 | 2 | H1 | 0.11 | 85 | 2 | -- no Step 3 -- | | | | 26.7 |

Comparative polyfluorourethane additives from isophorone diisocyanate,
fluoroalcohol and volatile hydrocarbon alcohol. Two step reaction with final vacuum stripping:

| A | I5 | 0.10 | F1 | 0.10 | 45 | 2 | S2 | 0.11 | 75 | 3.5 | -- no Step 3 -- | | | | 41.7 |
| B | I5 | 0.10 | F1 | 0.10 | 45 | 2 | S3 | 0.11 | 75 | 3 | -- no Step 3 -- | | | | 40.7 |

Comparative polyfluorourethane additives from 2,4-toluene diisocyanate,
fluoroalcohol, and volatile hydrocarbon alcohol. Two step reaction with final vacuum stripping:

| C | I6 | 0.10 | F1 | 0.10 | 50 | 2 | S1 | 0.11 | 60 | 4 | -- no Step 3 -- | | | | 44.6 |
| D | I6 | 0.10 | F1 | 0.10 | 60 | 2 | S2 | 0.11 | 75 | 2 | -- no Step 3 -- | | | | 44.1 |

Comparative polyfluorourethane additives from isophorone diisocyanate,
fluoroalcohol, and hydrocarbon alcohol less volatile than the solvent.
Three step reaction with final vacuum stripping:

| E | I5 | 0.10 | F1 | 0.10 | 45 | 2 | S4 | 0.09 | 75 | 2 | S1 | 0.02 | 75 | 2 | 40.6 |
| F | I5 | 0.10 | F1 | 0.10 | 45 | 2 | S6 | 0.09 | 75 | 3 | S1 | 0.02 | 75 | 2 | 32.7 |
| G | I5 | 0.10 | F1 | 0.10 | 45 | 2 | S7 | 0.09 | 75 | 2 | S1 | 0.02 | 75 | 2 | 39.7 |

TABLE 3-continued

Synthesis Detail for Example and Comparative Example

| | Step 1 | | | | | Step 2 | | | | Step 3 | | | | |
|---|---|---|---|---|---|---|---|---|---|---|---|---|---|---|
| | —NCO | | R$_f$OH | | tmp | time | ROH | | tmp | time | ROH | | tmp | time | |
| Example | Id$^c$ | mol | Id$^c$ | mol | °C. | hr | Id$^c$ | mol | °C. | hr | Id$^c$ | mol | °C. | hr | %F |

Comparative polyfluorourethane additives from 2,4-toluene diisocyanate, fluoroalcohol, and hydrocarbon alcohol less volatile than the solvent.
Two step reaction with final vacuum stripping:

| H | I6 | 0.10 | F1 | 0.10 | 60 | 2 | S5 | 0.09 | 75 | 2 | S1 | 0.02 | 75 | 1 | 42.1 |
| I | I6 | 0.10 | F1 | 0.10 | 50 | 2 | S6 | 0.09 | 75 | 3 | S1 | 0.02 | 75 | 2 | 33.2 |
| J | I6 | 0.10 | F1 | 0.10 | 55 | 2 | S7 | 0.09 | 75 | 2 | S1 | 0.02 | 75 | 1 | 41.8 |

Comparative polyfluorourethane additives from other isocyanates, fluoroalcohol, and volatile hydrocarbon alcohol.
Two step reaction with final vacuum stripping:

| K | I1 | 0.10 | F1 | 0.10 | 60 | 3 | S3 | 0.01 | 60 | 2 | — no Step 3 — | | | | 52.9 |
| L | I2 | 0.10 | F1 | 0.10 | 65 | 3 | S3 | 0.01 | 65 | 2 | — no Step 3 — | | | | 51.4 |

Comparative polyfluorourethane additives from isophorone diisocyanate and an excessive fluoroalcohol to volatile hydrocarbon alcohol ratio.
Two step reaction with final vacuum stripping:

| M | I5 | 0.10 | F1 | 0.19 | 60 | 3 | H1 | 0.02 | 60 | 2 | — no Step 3 — | | | | 50.7 |

Note a: In Examples 23 and 24, the amount of triisocyanate used in the synthesis of this example is expressed in gram-equivalents, not moles.
Note b: In Example 23 the isocyanate used in the synthesis of this example was a predissolved mixture of 75.0% DESMODUR N-3300, 13.8% ethyl acetate, 6.9% n-butyl acetate and 4.3% ethylene glycol monobutylether acetate, and no methylisobutylketone was used in the synthesis.
Note c: Id refers to the identifier listed at the beginning of the Examples under "Materials."

TABLE 4

Performance Test Results for Polyfluorourethane Additives in IMPERVO White Alkyd High Gloss Enamel (Paint P1)

| | Test Method 2 Contact Angle | | | | Test Method 3 Wash Durability | |
|---|---|---|---|---|---|---|
| | Water | | Hexadecane | | Hexadecane | |
| Example | advancing | receding | advancing | receding | advancing | receding |

Coating compositions contain polyfluorourethane additive sufficient to give 500 µg fluorine per g coating composition.
Polyfluorourethane additives derived from isophorone diisocyanate and an unsaturated hydrocarbon alcohol:

| 1 | 122 | 90 | 79 | 74 | 70 | 41 |
| 2 | 125 | 83 | 85 | 71 | 78 | 43 |
| 3 | 130 | 95 | 84 | 76 | 80 | 55 |
| 4 | 123 | 82 | 84 | 72 | 73 | 46 |
| 9 | 128 | 80 | 83 | 72 | 80 | 53 |
| 10 | 124 | 96 | 85 | 73 | 77 | 48 |
| 11 | 126 | 90 | 82 | 74 | 70 | 42 |
| 12 | 129 | 86 | 84 | 72 | 78 | 54 |

Comparative examples using polyfluorourethane additives derived from isophorone diisocyanate and a saturated hydrocarbon alcohol:

| A | 120 | 77 | 81 | 71 | 62 | 0 |
| B | 121 | 72 | 83 | 72 | 79 | 16 |
| E | 124 | 83 | 82 | 74 | 73 | 0 |
| F | 117 | 83 | 84 | 56 | 58 | 0 |
| G | 120 | 76 | 82 | 69 | 71 | 21 |

TABLE 4-continued

Performance Test Results for Polyfluorourethane
Additives in IMPERVO White Alkyd High Gloss Enamel (Paint P1)

| Example | Test Method 2 Contact Angle | | | | Test Method 3 Wash Durability | |
|---|---|---|---|---|---|---|
| | Water | | Hexadecane | | Hexadecane | |
| | advancing | receding | advancing | receding | advancing | receding |
| Polyfluorourethane additives derived from 2,4-toluene diisocyanate and an unsaturated hydrocarbon alcohol: | | | | | | |
| 5 | 125 | 96 | 82 | 75 | 79 | 55 |
| 6 | 122 | 84 | 78 | 74 | 68 | 45 |
| 7 | 124 | 81 | 84 | 65 | 79 | 58 |
| 8 | 126 | 90 | 81 | 76 | 74 | 54 |
| 13 | 128 | 96 | 82 | 73 | 76 | 52 |
| 14 | 128 | 95 | 82 | 70 | 80 | 60 |
| 15 | 121 | 81 | 83 | 67 | 82 | 54 |
| 16 | 125 | 87 | 82 | 73 | 80 | 65 |
| 17 | 121 | 97 | 77 | 76 | 67 | 49 |
| Comparative examples using polyfluorourethane additives derived from 2,4-toluene diisocyanate and a saturated hydrocarbon alcohol: | | | | | | |
| C | 127 | 91 | 84 | 71 | 69 | 24 |
| D | 125 | 85 | 81 | 73 | 62 | 2 |
| H | 124 | 89 | 79 | 72 | 63 | 0 |
| I | 120 | 83 | 82 | 65 | 62 | 14 |
| J | 125 | 89 | 81 | 75 | 75 | 26 |
| Polyfluorourethane additives derived from MONDUR TD-80, a mixture of toluene diisocyanates, and an unsaturated hydrocarbon alcohol: | | | | | | |
| 18 | 127 | 86 | 81 | 77 | 78 | 42 |
| 19 | 122 | 92 | 79 | 77 | 75 | 58 |
| Polyfluorourethane additives derived from monoisocyanates, an equimolar amount of fluoroalcohol, and sufficient saturated alcohol only to remove residual isocyanate: | | | | | | |
| K | 103 | 65 | 58 | 0 | 22 | 0 |
| L | 111 | 56 | 62 | 0 | 43 | 0 |
| Polyfluorourethane additives derived from TMXDI (an undifferentiated diisocyanate) and an unsaturated hydrocarbon alcohol: | | | | | | |
| 21 | 118 | 81 | 82 | 42 | 81 | 34 |
| Polyfluorourethane additives derived from TMDIH (an undifferentiated diisocyanate) and an unsaturated hydrocarbon alcohol: | | | | | | |
| 22 | 123 | 77 | 80 | 69 | 73 | 35 |
| Polyfluorourethane additives derived from DESMODUR N-3300 and an unsaturated hydrocarbon alcohol: | | | | | | |
| 23 | 122 | 92 | 80 | 72 | 65 | 39 |
| 24 | 124 | 90 | 79 | 73 | 70 | 43 |
| Polyfluorourethane additives derived from isophorone diisocyanate and an unsaturated hydrocarbon alcohol, but having 95% of the isocyanate reacted with fluoroalcohol and 5% with the hydrocarbon alcohol, essentially producing ($R_f$-X-O—CO—NH)-A-(NH—CO—O-X-$R_f$) with substantially no chemical bonding potential and thus no durable oil- or water-repellency: | | | | | | |
| M | 127 | 88 | 84 | 70 | 78 | 0 |
| Control coating without polyfluorourethane additive: | | | | | | |
| Control | 93 | 35 | 25 | 0 | 7 | 0 |

The data in Table 4 show the improved oil and water repellency, before and after washing, produced in the cured coating of Paint P1 by the indicated polyflouoroethane additive. The oil and water repellency of Comparative Examples, using a saturated hydrocarbon alcohol or a large deficiency of unsaturated alcohol (Comparative Example M), is not retained after the wash durability test.

TABLE 5

Performance Test Results for Polyfluorourethane
Additives in IMPERVO White Alkyd High Gloss Enamel (Paint P1)

| Example | Test Method 2 Contact Angle | | | | Test Method 3 Wash Durability | | Test Method 4 Anti-blocking Cure Day | | | | | | |
|---|---|---|---|---|---|---|---|---|---|---|---|---|---|
| | Water | | Hexadecane | | Hexadecane | | | | | | | | |
| | adv | rec | adv | rec | adv | rec | 1 | 2 | 3 | 4 | 5 | 6 | 7 | adv = advancing, rec = receding
Coating compositions contain polyfluorourethane additive sufficient to give 1000 ug fluorine per g coating composition.
Polyfluorourethane additives derived from isophorone diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 2 | 126 | 93 | 81 | 73 | 80 | 63 | 9 | 10 | | | | | |
| 3 | 128 | 97 | 82 | 73 | 84 | 63 | 9 | 10 | | | | | |
| 9 | 121 | 82 | 81 | 74 | 76 | 51 | 10 | | | | | | |
| 10 | 123 | 92 | 81 | 74 | 83 | 50 | 10 | | | | | | |
| 11 | 124 | 95 | 81 | 71 | 85 | 64 | 70 | | | | | | |
| 12 | 126 | 102 | 82 | 72 | 83 | 54 | 70 | | | | | | |
| 20 | 128 | 91 | 86 | 72 | 83 | 54 | 9 | 10 | | | | | |

Polyfluorourethane additives derived from 2,4-toluene diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 5 | 126 | 88 | 83 | 73 | 81 | 62 | 9 | 9 | 10 | | | | |
| 7 | 121 | 96 | 80 | 73 | 78 | 70 | 10 | | | | | | |
| 13 | 126 | 94 | 82 | 73 | 82 | 59 | 10 | | | | | | |
| 14 | 129 | 87 | 85 | 69 | 81 | 62 | 10 | | | | | | |
| 16 | 132 | 91 | 86 | 72 | 83 | 54 | 9 | 10 | | | | | |

Control coating without polyfluorourethane additive:

| Control | 93 | 35 | 25 | 0 | 7 | 0 | 3 | 4 | 5 | | | | |
|---|---|---|---|---|---|---|---|---|---|---|---|---|---|

The data in Table 5 show the improved oil and water repellency, before and after washing, and the improved anti-blocking properties produced in the cured of Paint P1 by the indicated polyfluorourethane additive.

TABLE 6

Performance Test Results for Polyfluorourethane
Additives in Moore's Gloss Finish Outside White House Paint (Paint P2)

| Example | Test Method 2 Contact Angle | | | | Test Method 3 Wash Durability | | Test Method 4 Anti-blocking Cure Day | | | | | | |
|---|---|---|---|---|---|---|---|---|---|---|---|---|---|
| | Water | | Hexadecane | | Hexadecane | | | | | | | | |
| | adv | rec | adv | rec | adv | rec | 1 | 2 | 3 | 4 | 5 | 6 | 7 | adv = advancing, rec = receding
Coating compositions contain polyfluorourethane additive sufficient to give 1000 ug fluorine per g coating composition.
Polyfluorourethane additives derived from isophorone diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 2 | 124 | 81 | 82 | 72 | 87 | 39 | 8 | 8 | 9 | 9 | | | |
| 3 | 123 | 79 | 82 | 71 | 86 | 48 | 8 | 8 | 9 | 9 | | | |
| 9 | 125 | 88 | 82 | 73 | 86 | 58 | 8 | 8 | 9 | 10 | | | |
| 10 | 126 | 86 | 83 | 71 | 81 | 44 | 8 | 9 | 9 | — | — | 10 | |
| 11 | 125 | 90 | 81 | 70 | 88 | 57 | 7 | 8 | 9 | 10 | | | |
| 12 | 125 | 90 | 83 | 74 | 82 | 54 | 9 | 9 | 10 | | | | |
| 20 | 127 | 78 | 81 | 74 | 83 | 53 | 8 | 9 | — | — | — | 10 | |

Polyfluorourethane additives derived from 2,4-toluene diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 5 | 126 | 87 | 83 | 68 | 84 | 62 | 3 | 4 | — | — | — | 9 | 9 |
| 7 | 122 | 88 | 82 | 76 | 84 | 68 | 4 | 7 | 8 | 9 | | | |
| 13 | 126 | 95 | 81 | 76 | 80 | 54 | 9 | 10 | | | | | |
| 14 | 126 | 89 | 82 | 74 | 82 | 58 | 8 | 9 | — | — | — | 10 | |
| 16 | 126 | 94 | 82 | 78 | 81 | 54 | 8 | 9 | — | — | — | 10 | |

Control coating without polyfluorourethane additive:

| Control | 115 | 51 | 41 | 0 | 27 | 0 | 0 | 0 | — | — | — | 5 | 5 |

The data in Table 6 show the improved oil and water repellency. before and after washing. and the improved anti-blocking properties produced in the cured coating of Paint P2 by the indicated polyfluorourethane additive.

TABLE 7

Performance Test Results for Polyfluorourethane Additives in DURON Exterior Alkyd House Paint (white, Paint P3)

| | Test Method 2 Contact Angle | | | | Test Method 3 Wash Durability | | Test Method 4 Anti-blocking | | | | | | |
|---|---|---|---|---|---|---|---|---|---|---|---|---|---|
| | Water | | Hexadecane | | Hexadecane | | Cure Day | | | | | | |
| Example | adv | rec | adv | rec | adv | rec | 1 | 2 | 3 | 4 | 5 | 6 | 7 | adv = advancing, rec = receding
Coating compositions contain polyfluorourethane additive sufficient to give 1000 ug fluorine per g coating composition.
Polyfluorourethane additives derived from isophorone diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 2 | 124 | 74 | 84 | 65 | 84 | 53 | 9 | 10 | | | | | |
| 3 | 124 | 79 | 83 | 67 | 83 | 59 | 9 | 10 | | | | | |
| 9 | 126 | 74 | 86 | 70 | 81 | 64 | 9 | 10 | | | | | |
| 10 | 123 | 82 | 81 | 71 | 79 | 46 | 9 | 10 | | | | | |
| 11 | 124 | 86 | 81 | 66 | 81 | 45 | 9 | 10 | | | | | |
| 12 | 123 | 88 | 84 | 71 | 79 | 62 | 9 | 10 | | | | | |
| 20 | 126 | 86 | 83 | 75 | 78 | 45 | 9 | 9 | 10 | | | | |

Polyfluorourethane additives derived from 2,4-toluene diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 7 | 124 | 91 | 80 | 69 | 81 | 66 | 7 | 9 | 10 | | | | |
| 13 | 120 | 91 | 82 | 72 | 79 | 63 | 9 | 10 | | | | | |
| 14 | 127 | 92 | 82 | 71 | 79 | 49 | 9 | 9 | 10 | | | | |
| 16 | 127 | 91 | 82 | 77 | 79 | 62 | 9 | 10 | | | | | |

Control coating without polyfluorourethane additive:

| Example | adv | rec | adv | rec | adv | rec | 1 | 2 | 3 | 4 | 5 | 6 | 7 |
|---|---|---|---|---|---|---|---|---|---|---|---|---|---|
| Control | 104 | 54 | 30 | 24 | 21 | 12 | 4 | 6 | 6 | 8 | — | — | 9 |

The data in Table 7 show the improved oil and water repellency. before and after washing. and the improved anti-blocking properties produced in the cured coating of Paint P3 by the indicated polyfluorourethane additive.

TABLE 8

Performance Test Results for Polyfluorourethane Additives in ENTERPRISE Gloss Polyurethane (Paint P4)

| | Test Method 2 Contact Angle | | | | Test Method 3 Wash Durability | | Test Method 4 Anti-blocking | | | | | | |
|---|---|---|---|---|---|---|---|---|---|---|---|---|---|
| | Water | | Hexadecane | | Hexadecane | | Cure Day | | | | | | |
| Example | adv | rec | adv | rec | adv | rec | 1 | 2 | 3 | 4 | 5 | 6 | 7 | adv = advancing, rec = receding
Coating compositions contain polyfluorourethane additive sufficient to give 1000 ug fluorine per g coating composition.
Polyfluorourethane additives derived from isophorone diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 2 | 119 | 97 | 79 | 74 | 77 | 65 | 9 | 10 | | | | | |
| 3 | 116 | 99 | 77 | 76 | 77 | 73 | 9 | 10 | | | | | |
| 9 | 120 | 91 | 79 | 75 | 79 | 74 | 10 | | | | | | |
| 10 | 122 | 107 | 79 | 76 | 77 | 59 | 10 | | | | | | |
| 11 | 120 | 101 | 76 | 73 | 79 | 73 | 10 | | | | | | |
| 12 | 122 | 113 | 79 | 76 | 79 | 74 | 10 | | | | | | |
| 20 | 123 | 97 | 81 | 80 | 79 | 62 | 10 | | | | | | |

Polyfluorourethane additives derived from 2,4-toluene diisocyanate and an unsaturated hydrocarbon alcohol:

| Example | adv | rec | adv | rec | adv | rec | 1 | 2 | 3 | 4 | 5 | 6 | 7 |
|---|---|---|---|---|---|---|---|---|---|---|---|---|---|
| 5 | 124 | 87 | 82 | 79 | 80 | 60 | 10 | | | | | | |
| 7 | 119 | 113 | 78 | 77 | 78 | 78 | 10 | | | | | | |
| 13 | 121 | 102 | 79 | 78 | 79 | 74 | 10 | | | | | | |

TABLE 8-continued

Performance Test Results for Polyfluorourethane Additives in ENTERPRISE Gloss Polyurethane (Paint P4)

| | Test Method 2 Contact Angle | | | | Test Method 3 Wash Durability | | Test Method 4 Anti-blocking | | | | | | |
|---|---|---|---|---|---|---|---|---|---|---|---|---|---|
| | Water | | Hexadecane | | Hexadecane | | Cure Day | | | | | | |
| Example | adv | rec | adv | rec | adv | rec | 1 | 2 | 3 | 4 | 5 | 6 | 7 |
| 14 | 122 | 101 | 81 | 77 | 81 | 74 | 10 | | | | | | |
| 16 | 124 | 113 | 81 | 79 | 80 | 78 | 10 | | | | | | |
| Control coating without polyfluorourethane additive: | | | | | | | | | | | | | |
| Control | 91 | 58 | 18 | 9 | 13 | 8 | 6 | 8 | 9 | 9 | — | — | 9 |

The data in Table 8 show the improved oil and water repellency, before and after washing, and the improved anti-blocking properties produced in the cured coating of Paint P4 by the indicated polyfluorourethane additive.

What is claimed is:

1. A coating composition comprising an alkyd or urethane resin containing unsaturation provided by aliphatic or drying oil acid residue and a polyfluorourethane of Formula II

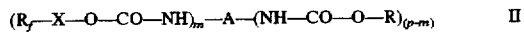

wherein $R_f$ is a $C_2$–$C_{20}$ linear or branched fluorocarbon,

X is —$(CH_2)_n$—, —$(CH_2)_gSO_2(CH_2)_t$—, or —$SO_2N(R_1)CH_2CH_2$— wherein n is 1 to about 20; g and t are each independently 1 to about 3; z is 0, 1 or 2; and $R_1$ is an alkyl of 1 to about 4 carbon atoms;

A is an aliphatic, cycloaliphatic, aromatic, or heterocyclic radical;

R is a $C_3$–$C_{20}$ linear, branched, or cyclic aliphatic group containing at least one ethylenically unsaturated double bond and optionally at least one phenyl or phenyl substituted with $C_1$–$C_6$ alkyl or halogen;

p is 2 to 3; and m is from about 0.8 to about 1.25 when p is 2, and m is from about 1 to about (p-1) when p is greater than 2.

2. The coating composition of claim 1 wherein $R_f$ is $F(CF_2)_n$— wherein n is 1 to about 20.

3. The coating composition of claim 1 wherein X is $(CH_2)_n$ wherein n is 1 to about 20.

4. The coating composition of claim 1 having from about 50 to about 10,000 µg/g by weight of fluorine based on non-volatile content of said coating composition.

5. A cured coating composition comprising an alkyd or urethane resin containing unsaturation provided by aliphatic or drying oil acid residue and a polyfluorourethane of Formula II

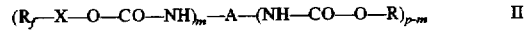

wherein $R_f$ is a $C_2$–$C_{20}$ linear or branched fluorocarbon,

X is —$(CH_2)_n$—, —$(CH_2)_gSO_2(CH_2)_t$—, or —$SO_2N(R_1)CH_2CH_2$— wherein n is 1 to about 20; g and t are each independently 1 to about 3; z is 0, 1 or 2; and $R_1$ is an alkyl of 1 to about 4 carbon atoms;

A is an aliphatic, cycloaliphatic, aromatic, or heterocyclic radical;

R is a $C_3$–$C_{20}$ linear or branched aliphatic group containing at least one ethylenically unsaturated double bond and optionally at least one phenyl or phenyl substituted with $C_1$–$C_6$ alkyl or halogen;

p is 2 to 3; and m is from about 0.8 to about 1.25 when p is 2, and m is from about 1 to about (p-1) when p is greater than 2.

6. The cured coating composition of claim 5 having an advancing hexadecane contact angle of at least 60 degrees.

7. The cured coating composition of claim 5 having a receding hexadecane contact angle after washing of at least 40 degrees.

8. A method of improving the oil repellency of a cured alkyl or urethane coating composition comprising the addition to an alkyd or urethane resin containing unsaturation provided by aliphatic or drying oil acid residue prior to curing of an effective amount of a polyfluorourethane of Formula II

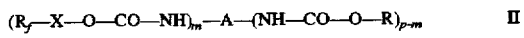

wherein $R_f$ is a $C_2$–$C_{20}$ linear or branched fluorocarbon,

X is —$(CH_2)_n$—, —$(CH_2)_gSO_2(CH_2)_t$—, or —$SO_2N(R_1)CH_2CH_2$— wherein n is 1 to about 20; g and t are each independently 1 to about 3; z is 0, 1 or 2; and $R_1$ is an alkyl of 1 to about 4 carbon atoms;

A is an aliphatic, cycloaliphatic, aromatic, or heterocyclic radical;

R is a $C_3$–$C_{20}$ linear or branched aliphatic group containing at least one ethylenically unsaturated double bond and optionally at least one phenyl or phenyl substituted with $C_1$–$C_6$ alkyl or halogen;

p is 2 to 3; and m is from about 0.8 to about 1.25 when p is 2, and m is from about 1 to about (p-1) when p is greater than 2.

9. The method of claim 8 wherein the coating composition containing Formula II has from about 50 to about 10,000 µg/g by weight of fluorine based on non-volatile content of said coating composition.

10. The method of claim 8 wherein the coating composition after curing has an advancing hexadecane contact angle of at least 60 degrees.

* * * * *